Feb. 15, 1938. T. T. MILLER 2,108,317
METHOD OF AGING WHISKY
Filed May 6, 1935
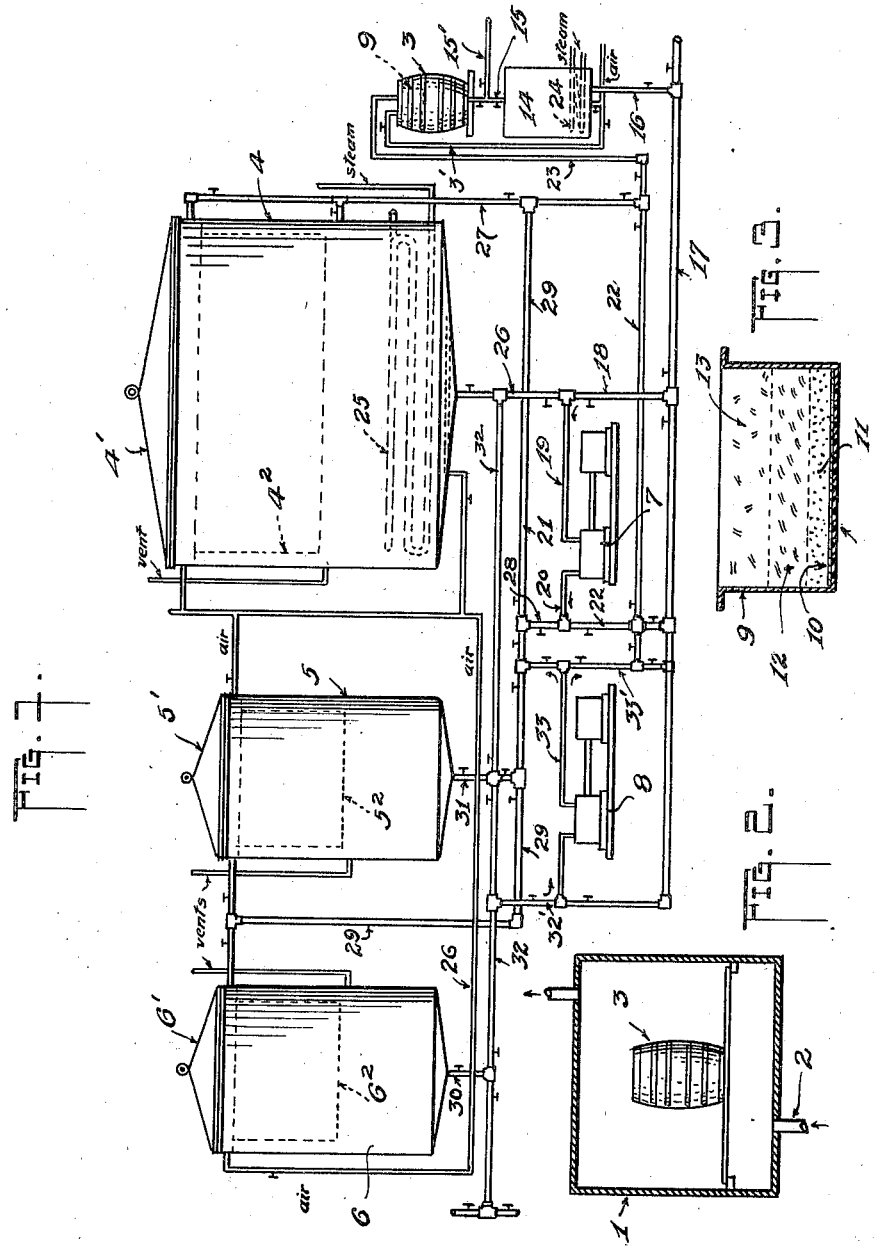
Inventor
T. T. Miller,
By L. M. Thurlow
Attorney Patented Feb. 15, 1938

2,108,317

UNITED STATES PATENT OFFICE 2,108,317

METHOD OF AGING WHISKY

Thomas T. Miller, Peoria, Ill., assignor of five-twelfths to Alfred J. Bair, Peoria, Ill.

Application May 6, 1935, Serial No. 19,937

4 Claims. (Cl. 99—48)

This invention relates to a method of aging whisky; relating also to the treatment of and conditioning of certain materials for use in practicing such method.

The main object is to produce a very palatable "aged" whisky of fine aroma in a much shorter time than that required by the older well known four-year-storage method.

Another object is to use certain parts of previously used wooden barrels in more or less finely divided form from which to produce a fine palatable whisky of fine flavor and aroma in a comparatively short period of time as compared with older methods.

Still another object lies in the treatment of oaken containers, either new containers or those that have been already used for containing whisky, and to subject them exteriorly to heat treatment, while containing whisky spirits, by which to produce in a comparatively short time an "aged", more palatable, and better whisky than produced by other methods heretofore known.

Further, to employ exteriorly heat treated wooden barrels while containing spirits for producing a fine properly aged whisky in a comparatively short time and to employ the barrels so heat treated as aids in producing other bulks of the desired aged product, while also producing barrels in excellent condition for whisky storage, for reduction to small portions for use in "aging" whisky-spirits.

Again, an object is to furnish a method of treating wood portions of previously used barrels with whisky spirits and from the product of such treatment together with said wood portions produce quantities of several different grades of aged whisky of fine color, palatability, flavor and aroma.

As an aid to the understanding of my method the accompanying drawing is provided wherein:

Figure 1 is an apparatus, illustrated in a rather diagrammatic form carrying out certain steps of my complete method, Figure 2 is an elevation, in section, of an enclosure for receiving heated air showing a wooden barrel enclosed in the same for subjection to heat treatment, and Figure 3 is an elevation in section of a basket used in my method.

My said method includes as one of its important steps, the treatment of small or finely divided portions of the inner parts of oaken barrels that have been previously treated or that have been used for holding or storing whisky, and subjecting such portions to treatment with whisky spirits for producing "aged" whisky. These said portions may include certain proportions of the charred wood of the barrel, the colored wood just beneath it, known in the distilling industry as "toasted" wood resulting from barrel-charring operations, and that portion of the wood, also, that lies beneath the said toasted wood and which for identification purposes I shall term "underlying" wood, although except, for color the said underlying wood only may be used to produce a satisfactory "aged" whisky. That is to say, in the practical production of an aged whisky by my method it is found that while the said charred portions filter and tone down the spirits under treatment, and also that while the toasted portions impart any desired color, the underlying wood due to its impregnation with old whisky residue, together with such chemical changes in the wood as naturally take place, is the important substance for my use by which a most excellent flavor and aroma is imparted to the whisky spirits under treatment, this resulting in a comparatively short time due to the employment of the finely divided underlying wood mentioned.

Newly distilled whisky spirits have been stored in old or previously used barrels for the purpose of extracting color, and in an attempt to provide "aging" and to derive flavor from the wood, but this has not been found to yield any great advantage in practice and not worth the time and labor expended. However, by finely dividing the wood as practiced in my method, by shaving the same or reducing it in any other manner for producing the finely divided form a quick and satisfactory result is possible. If the charred wood and toasted wood are used, I may provide separate bulks of them together with the "underlying" wood all in such proportions as to obtain various results in bulks of better and better flavor and aroma, this being due, however, to the proportion of "underlying" wood used. By treatment of these bulks with whisky spirits the named results are possible the use of heat being proposed merely as hastening the final result.

As an example of my method of treating the wood mentioned the following may be given, but small bulks being named for convenience. A fair grade of whisky may be had by using the proportion of say two and one-half pounds of the charred wood, one-half pound of the toasted wood, and seven pounds of the "underlying" wood, making about ten pounds total bulk. This bulk is placed in a perforated receptacle enclosed in a container of metal, or it may be wood, according to what I wish to accomplish, as will appear. Now about fifty gallons of whisky spirits is continuously passed through the mass by pumping, or otherwise while maintaining the bulk at a temperature of from 80° to 110° F. for a period of about 24 hours while passing air through the same for oxidizing purposes, the yield of whisky being about forty-eight gallons. This will produce a better grade of aged whisky than under any method other than the usual four year storage method. To produce a better grade of goods a bulk of the solids may be used wherein the amount of "underlying" wood is still larger while using the same number of gallons of the spirits. The yield will be about as in the first example except, of course, for a slightly greater absorption-loss due to the greater bulk of the solids used. Still better grades may be had by again varying the amount of wood portions in accordance with the desire, the "underlying" wood being always greater in amount, it being remembered that the charred wood and toasted wood merely clear, tone down, and color the product. In other words, a clear product results from the use of the charred portions, while color is imparted by the toasted wood, both desirable, of course, but the mellowing is produced by the underlying wood together with excellent fine flavor and aroma and therefore an "aged" whisky is the result, not unlike that aged in oaken barrels in the customary manner for as much as four years, the usual time required for so called "full aging".

For my purpose, I may shave, cut in small portions, or otherwise finely divide the wood or barrels that have held whisky in storage, but my method includes the method of preparing barrels for this use as will appear in the following description of the method as practiced.

In the drawing, Figure 2, is illustrated an enclosure 1, constituting an oven into which dry heated air is introduced through a pipe 2, for example. Within the oven is placed a tightly bunged barrel, 3, or as many barrels, new or old as desired, filled with raw whisky spirits. A temperature of about 160° F. is used, the oven being held at this point for about four hours and then reduced to 126° F., where it may be held at the latter temperature for a period of from 24 hours to 240 hours, the time required depending upon the results desired.

This heat treatment draws the spirits into the wood thereby carrying aldehydes, fusel oil, and other undesirable properties into the wood where they are neutralized and oxidized, creating such a condition that when the barrel is stored for a period of from 30 to 90 days at a temperature of from 118° to 126° F. the desired wood material is produced and is in proper condition to be reduced in form for use in making aged whisky as decribed above.

In Figure 1 of the drawing a barrel 3 or as many of the same as desired are set up after the heat treatment described wherein to practice the aging method first described herein, or such method may also be carried on in the balance of the apparatus shown in said figure. Or, again, the barrel 3, or many of the same, may be used in conjunction with said apparatus in furtherance of the method as will now be made known. But it is to be understood that while by the exterior heat-treating of the barrels as described I may produce wood material for use in carrying out my method, I may also use barrels from other sources or those barrels that have already been used for whisky storage.

The said apparatus of Figure 1, in addition to the barrel 3 consists of a series of tanks or receivers, in this instance three, denoted at 4, 5, and 6, connected through a piping system with circulating pumps 7, 8. Said piping system is so arranged that material to be treated in the several tanks may be pumped where desired within the entire apparatus or pumped outside the same, valves in said piping serving to direct the material as required. The several branches of the piping will be specifically referred to herein by reference characters as the description of the operation proceeds.

Within the barrel is suspended a basket 9, Figure 1, see also Figure 3, having a perforated bottom. Upon this, preferably, is placed a covering of cotton flannel, 10, overlying which is a layer of charcoal, 11. Upon this is placed a layer of "toasted" wood, 12, and, finally, this supports a bulk of the "underlying" wood 13.

Beneath the barrel, for example, may be a receiver 14, into which extends a pipe, 15, for the delivery thereinto of spirits from said barrel 3. A pipe 16, extends from said receiver into a pipe 17, leading into the pump 7 through branch pipes 18 and 19. Said pump discharges through branch pipes 20, 21, 22 and 23 into the basket 9 of the barrel and from thence through the barrel and again into the named receiver 14 to be further passed through the pipe circuit just mentioned. This continuous flow of the whisky spirit through the basket-contents, which I shall refer to as "formula" to more easily indentify it, is continued as long as required to produce the desired "aged" whisky. But at the same time the spirits are kept tightly sealed throughout the described action, while being held at a temperature of not over 110° F. by passing steam through a coil 24 within the receiver 14, there also being a pipe 3' extending into the spirits in the barrel for circulating of air for oxidating purposes.

The purpose of the barrel 3, in the circuit of spirits is that of a service tank, as it may be termed, into the wood of which enters the flavor extracted from the "formula" thereby preparing said barrel for use in producing more "formula" (wood material), and for use in producing the aged whisky in other barrels or within the tanks or receivers 4, 5 and 6, the latter, be it understood, answering the same purpose as does the barrel 3 but permitting much larger quantities or bulks of the whisky to be produced, furthermore, the thus treated barrel has an effect on the spirits circulating through it by improving its flavor and aroma in addition to the formula material. Besides processing the barrels I may perhaps even place in said barrels, while under treatment quantities of new or raw wood portions and subject the same to treatment for their preparation as the "formula" material. When the whisky has been circulated through the barrel 3 for a length of time sufficient to make it suitable to the taste, and with a proper aroma, it may be drawn off as finished goods for storage or sale through a branch pipe 15, for example.

Each tank or receiver 4, 5, and 6 is tightly sealed by covers 4', 5', and 6' respectively, and each has a basket corresponding to 9 of Figure 3, being identified severally by $4^2$, $5^2$, and $6^2$, each holding the "formula" for passage through it of whisky spirits.

The tank or receiver 4 is provided with a steam coil 25, and, of course, tanks 5 and 6 may be so provided if desired but these are not shown in the drawing. The coil 25 may provide sufficient heat to operate through the system or from 110° to 126° F. An "air-line" 26 is connected into each of the three tanks for oxidizing purposes. The piping system is connected not only with the tanks or receivers 4, 5, and 6 and the pumps 7, 8 but is also connected with the pipe system of the barrel 3 and receiver 14 so that any material pumped to and through the said tanks or receivers may also pass into and through said barrel, or through as large a number of the latter as may be set up for treatment, to improve the wood thereof, as above described, ready for reducing to small portions for "formula" purposes. And it is to be understood that the barrels need not necessarily contain the "formula" basket, in such case, since the passage of the whisky being perfected in the said tanks 4, 5, and 6 through the barrel or barrels will serve to improve the wood, the movement of spirits being from the tank 4, for example, through pipes 26, 19, pump 7, pipes 20, 22, and 23 into the barrel or barrels, and thence back through receiver 14, if used, and then through pipes 16, 17, 18, and 19 to said pump in a complete circuit.

All of the tanks may be used at once or but one or two of them, depending upon the grade of product required. That is to say, for a certain grade the tank 4 only may be employed and having been charged with its "formula" and the required bulk of whisky spirits heated by the coil 25, the circulation of the spirits is maintained through the branch pipes 26 and 19, pump 7, pipes 20, 21, and 27 as a complete circuit by which the formula in basket 4² continuously lends its character to the spirits.

If the formula of that tank does not yield a product fully satisfactory, the spirits under treatment may be valved through pipes 26 and 19 to pump 7 through pipes 20, 22 and 29 to either or both tanks 5 and 6 and circulated through the formula of those tanks, thence through pipes 30 or 31, or both, to pipe 32, and out of the system as finished goods, or, through pump 8 the material may be passed from pipe 32, 32' by said pump into pipes 33, 33' and 22 to the tank 4 and to the barrel 3 through pipe 27 or 23 respectively. The supply of fresh charges of new whisky-spirits to the tank system or barrel 3 is through pipe 17 from any source, not shown, through pipes 18 and 19, pump 7 and pipes 20, 28, 29, 27, or 23, as elected by valving operations.

Naturally the temperature used in the tank or tanks 4, 5, and 6 and the time required for treatment may correspond substantially with what has been stated in respect to "formula" treatment described earlier herein. Where a large number of barrels 3 are employed at the same time in the system with some of them, or each of them holding its own "formula", the material circulated through the entire system of Figure 1 assists the "formula" of the tanks by adding thereto, the whole working together as a unit.

Whether using one or more of the tanks 4, 5 and 6 or the formula-holding barrel, or barrels in large number, results are achievable and where the barrel or barrels are employed new formula material (processed wood) is being continuously produced at the same time as has already been pointed out.

It has been common practice to place a steam heated coil within a barrel of whisky spirits in an attempt to produce aged whisky but it has been found that the internally applied heat draws tannic acid from the wood into the spirits making the latter extremely unpalatable and lacking in aroma. The result is an inferior article that is, of course, unsalable. However, heat treatment on the outside of the barrel as a preliminary aging treatment by my method produces the result heretofore outlined, the proper flavor, palatability and aroma being assured.

I claim:

1. The method of producing whisky having flavor and aroma characteristic of aged whisky, which method comprises subjecting whisky spirits lacking the characteristics of aged whisky in a container to contact with finely divided wood from oaken whisky barrels which have previously held aged whisky and which wood has been impregnated with such whisky in the course of the aging thereof, said wood consisting substantially of that portion of the wood of the barrel which lies immediately beneath the charred portion and interiorly of the outer and substantially unaffected portion of a barrel.

2. The method of producing whisky having flavor and aroma characteristic of aged whisky, which method comprises subjecting whisky spirits lacking the characteristics of aged whisky in a container in the presence of air to contact with finely divided wood from oaken whisky barrels which have previously held aged whisky and which wood has been impregnated with such whisky in the course of the aging thereof, said wood consisting substantially of that portion of the wood of the barrel which lies immediately beneath the charred portion and interiorly of the outer and substantially unaffected portion of a barrel.

3. The method of producing whisky having flavor and aroma characteristic of aged whisky, which method comprises subjecting whisky spirits lacking the characteristics of aged whisky in a container in the presence of air and at a temperature of from 80° F. to 110° F. for about twenty-four hours to contact with finely divided wood from oaken whisky barrels which have previously held aged whisky and which wood has been impregnated with such whisky in the course of the aging thereof, said wood consisting substantially of that portion of the wood of the barrel which lies immediately beneath the charred portion and interiorly of the outer and substantially unaffected portion of a barrel.

4. The method of producing whisky having flavor and aroma characteristic of aged whisky, which method comprises subjecting whisky spirits lacking the characteristics of aged whisky to a treatment including continuously flowing such whisky to be treated for at least twenty-four hours in contact with finely divided wood from oaken whisky barrels which have previously held aged whisky and which wood has been impregnated with such whisky in the course of the aging thereof, said wood consisting substantially of that portion of the wood of the barrel which lies immediately beneath the charred portion and interiorly of the outer and substantially unaffected portion of a barrel.

THOMAS T. MILLER.